INVENTORS
THOMAS J. LEE, LAWRENCE M. PATRICK
& ALFRED W. SCHULTZ.
BY
ATTORNEYS

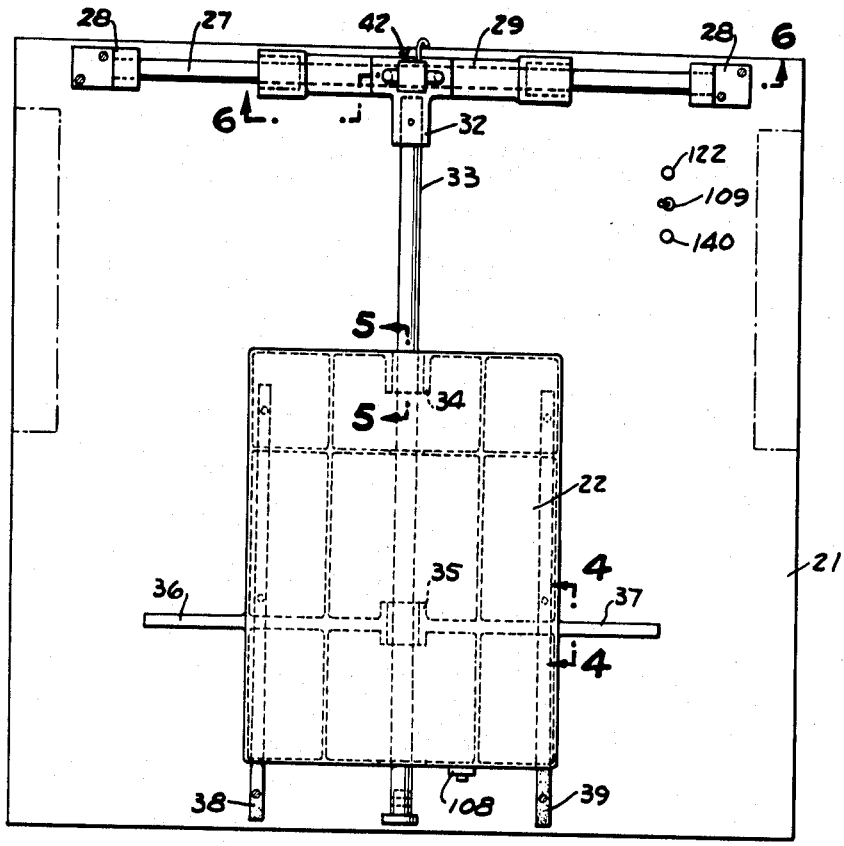
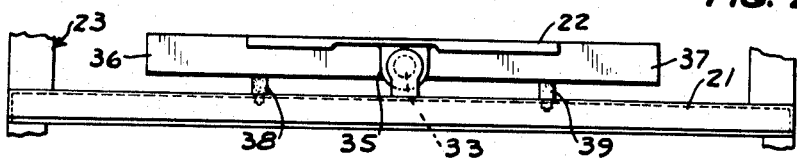
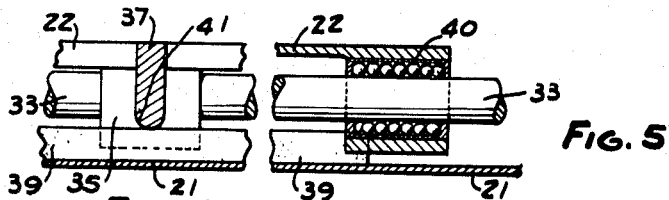

March 22, 1966 T. J. LEE ET AL 3,241,434
CAMERA APPARATUS
Original Filed Dec. 30, 1957 3 Sheets-Sheet 3

INVENTORS
THOMAS J. LEE, LAWRENCE J. PATRICK
& ALFRED W. SCHULTZ
BY
Barnes, Kisselle, Raisch & Choate
ATTORNEYS United States Patent Office 3,241,434
Patented Mar. 22, 1966

3,241,434
CAMERA APPARATUS
Thomas J. Lee, Livonia, Lawrence M. Patrick, Detroit, and Alfred W. Schultz, East Detroit, Mich., assignors to R. L. Polk & Co., Detroit, Mich., a corporation of Delaware
Original application Dec. 30, 1957, Ser. No. 705,853, now Patent No. 3,078,775, dated Feb. 26, 1963. Divided and this application Dec. 14, 1961, Ser. No. 160,418
6 Claims. (Cl. 88—24)

This is a division of application Ser. No. 705,853, filed on Dec. 30, 1957, now U.S. Patent No. 3,078,775 issued Feb. 26, 1963.

This invention relates to camera apparatus and particularly to camera apparatus for recording a multiplicity of names and addresses on film.

The camera apparatus of this invention is intended to be used as a part of an addressing system wherein a plurality of names and addresses are recorded in succession on a roll of film. The film is then developed and the developed images corresponding to the names and addresses are printed photographically onto a roll of paper. The individual names and addresses are cut from the developed roll of paper and are adhered to envelopes or other pieces of advertising literature.

It is an object of this invention to improve upon camera apparatus presently employed in addressing systems of the type described. The improvements embodied in the camera apparatus of the present invention include, among others: an electrically controlled camera wherein the complete cycle of operating the shutter and feeding the film is initiated by actuating a single switch conveniently located on the copy holding easel; and a copy holding easel mounted for rectilinear movement in two perpendicular directions with a locking device thereon for locking the easel against movement in one direction while permitting movement in the other direction to facilitate proper positioning of the names and addresses in the lists for successive exposures.

Other objects and advantages of the invention will be apparent from the following description and drawings in which:

FIG. 2 is a plan view of the camera table and easel shown in FIG. 1.

FIG. 3 is a fragmentary front elevational view of the portion of the apparatus shown in FIG. 2.

FIG. 4 is a fragmentary sectional view on an enlarged scale taken along the line 4—4 in FIG. 2.

FIG. 5 is a fragmentary sectional view on an enlarged scale taken along the line 5—5 in FIG. 2.

Figure 1:
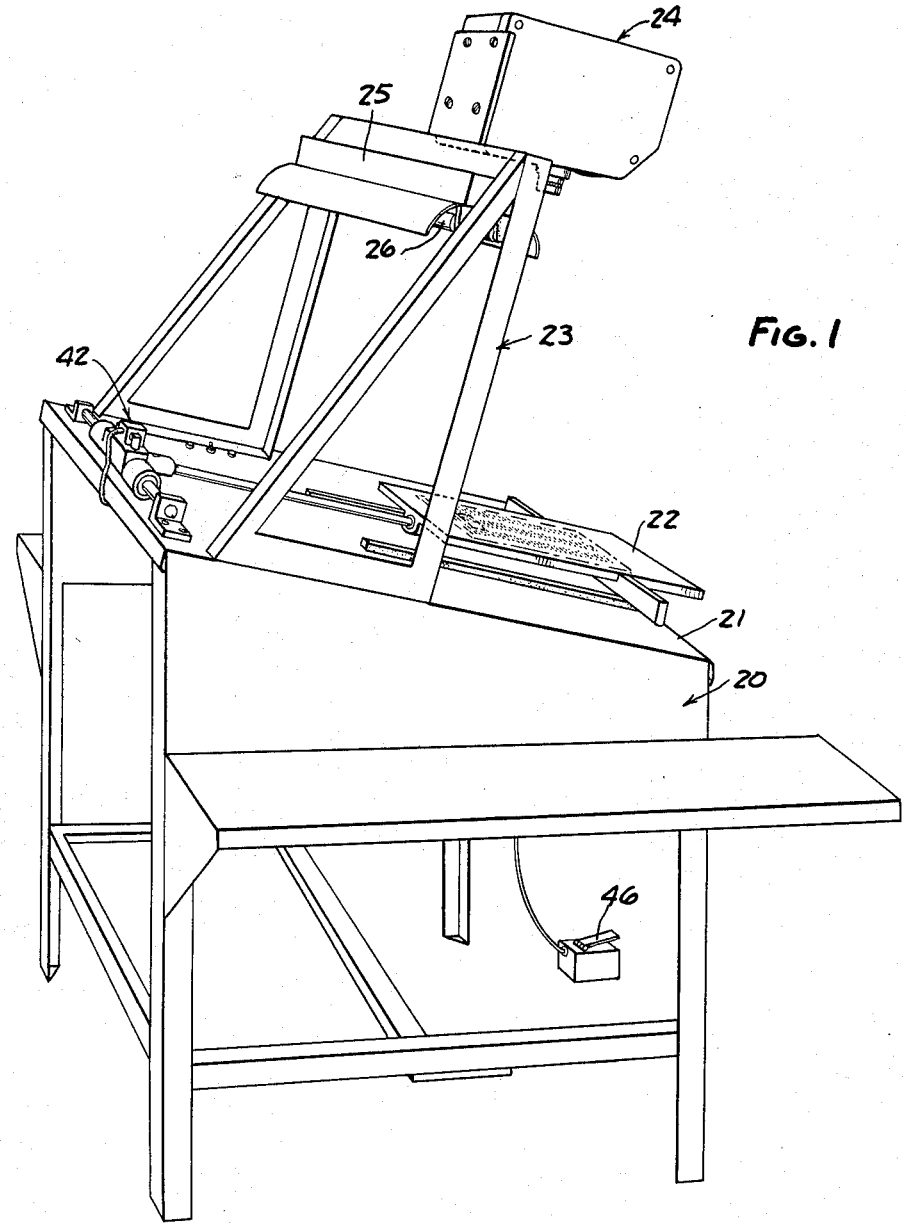
FIG. 1 is a perspective view of the camera apparatus embodying the invention.

Referring to FIG. 1, the camera apparatus comprises a frame 20 which supports a flat inclined table 21. The table 21 is inclined upwardly and rearwardly away from the operator who is normally seated on the right of the apparatus as it is shown in FIG. 1. An easel 22 made of light-colored plastic material for supporting a list of names and addresses or other items to be photographed is mounted on table 21 for movement longitudinally and laterally thereof as presently described. An auxiliary frame 23 supports a camera 24 in position above table 21. Auxiliary frame 23 also supports an illuminating device 25 including fluorescent tubes 26 which illuminate the surface of table 21.

Figure 6:
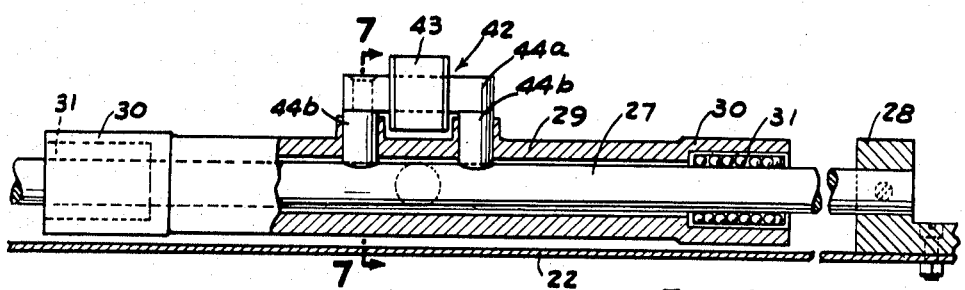
FIG. 6 is a fragmentary sectional view on an enlarged scale taken along the line 6—6 in FIG. 2.

Referring to FIG. 2, the means for supporting the easel 22 for movement longitudinally and laterally in a single plane over table 21 comprises a horizontal shaft 27 which is supported at the rear of the table by brackets 28. A tubular member 29 is slidably mounted on shaft 27. As shown in FIG. 6 the ends 30 of tubular member 29 are enlarged and support ball bearings 31 to facilitate the longitudinal movement of the tubular member 29 on shaft 27.

As shown in FIG. 2 tubular member 29 includes a tubular projection 32 extending outwardly from the center thereof with its axis at right angles to the axis of the tubular member 29. One end of a second shaft 33 is fixed in the projection 32.

Referring to FIGS. 2 and 3, spaced tubular supports 34, 35 are mounted for longitudinal movement on the second shaft 33 and the easel 22 is fixed on these supports 34, 35. The front tubular support 35 includes radial arms 36, 37 which extend across the underside and beyond the side edges of the easel 22. Arms 36, 37 slidingly rest on rails 38, 39 which are fixed to the surface of table 21 and extend longitudinally thereof. As shown in FIG. 5 tubular support 34 has a ball bearing 40 fixed therein; the lower tubular support 35 similarly supports a ball bearing to facilitate the longitudinal movement of the easel 22 on the second shaft 33. The contact of the arms 36, 37 with the rails 38, 39 prevents rotation of the easel as it is moved longitudinally or transversely of the table 21 so that the easel 22 moves in a flat plane parallel to the plane of table 21. By moving the easel longitudinally on the second shaft 33, the easel is moved longitudinally of the table 21, that is, forwardly and rearwardly. By moving the easel, second shaft 33 and tubular member 29 longitudinally relative to the first shaft 27, the easel is moved laterally or across the table 21.

The rails 38, 39 are preferably made of a low-friction material such as nylon and the contacting edges of the arms 36, 37 are curved as shown at 41 in FIG. 4 to reduce the friction between the arms 36, 37 and the rails 38, 39 to a minimum.

In order to make it easier for the operator to manipulate the easel 22 when it is desired to photograph successive names and addresses from a list that extends vertically of the copy sheet, a brake 42 is provided to selectively lock the easel 22 against movement laterally of the table 21. As shown in FIG. 2 the brake 42 is mounted on the tubular member 29 and operates to lock the tubular member 29 against movement longitudinally of the first shaft 27, thereby preventing any lateral movement of the second shaft 33 and the easel 22 which is mounted thereon.

Figure 7:
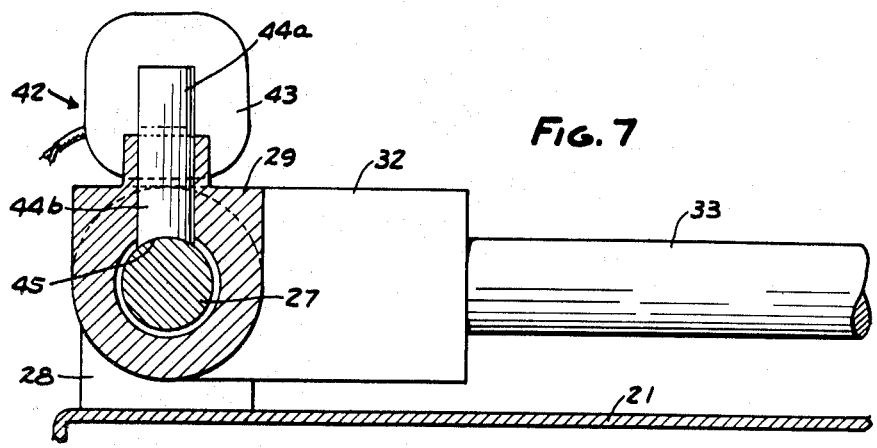
FIG. 7 is a fragmentary sectional view on an enlarged scale taken along the line 7—7 in FIG. 6.

Referring to FIGS. 6 and 7, brake assembly 42 includes an electromagnet 43 and a movable armature including a crosspiece 44a and a pair of movable armature members 44b in the form of pins which are movable radially toward and away from the first shaft 27. As shown in FIG. 7 the end 45 of each pin 44 nearest shaft 27 is arcuate and concave. The crosspiece 44a, pins 44b and shaft 27 are made of magnetic material and the tubular support 29 is made of nonmagnetic material. When the electromagnet 43 is energized a magnetic field is created through first shaft 27 and the crosspiece 44a, and pins 44b are urged into contact with the surface of the first shaft 27 to lock the tubular member 29 against longitudinal movement on the shaft 27. The operation of the brake 42 is controlled by a foot-operated switch 46 (FIG. 1).

Figure 8:
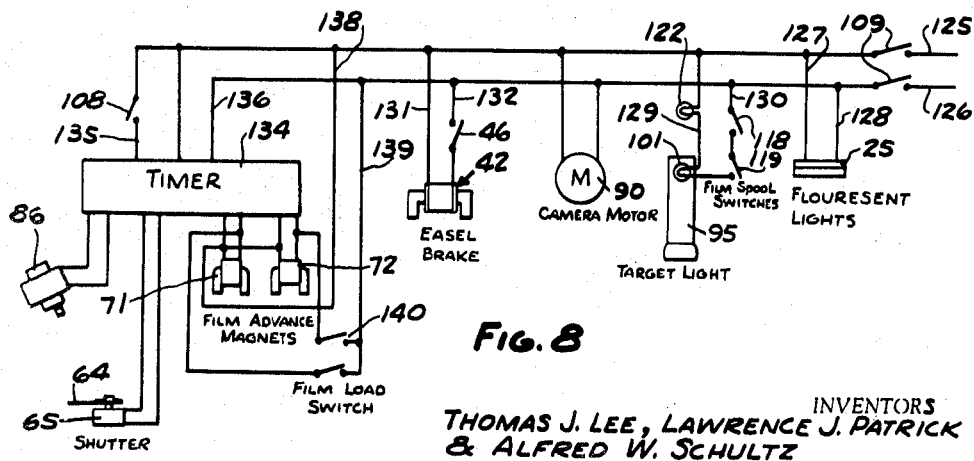
FIG. 8 is a diagrammatic wiring diagram of the camera apparatus.

Referring to FIG. 8, which is a diagrammatic wiring diagram of the camera apparatus, the camera includes a film supply spool and a film take-up spool. The film is guided over an aperture between the spools which is over an opening in the bottom wall of the camera housing. An appropriate lens assembly is mounted on the underside of the camera and includes a shutter 64 fixed on the shaft of a rotary type solenoid 65. The shutter 64 is normally positioned over the lens and is rotated out of its overlying position by energization of solenoid 65. The shutter is returned to its normal position after the solenoid 65 is deenergized by a clock spring (not shown).

As more fully shown in our application, Ser. No. 705,853, filed Dec. 30, 1957, now U.S. Patent No. 3,078,775, issued Feb. 26, 1963, of which this application is a division, a mechanism is provided for holding and moving the film in successive increments past the aperture. This mechanism includes a stationary magnet assembly 71 which operates to hold the film against the aperture and a movable magnet assembly 72 which operates to grip and move the film toward the take-up spool. When the fixed magnet assembly 71 is energized, it moves an armature (not shown) away from the aperture to release the film. When the magnet assembly 72 is deenergized, the film is gripped so that, when the magnet assembly 72 is moved, the film is moved. A solenoid 86 is mounted in the camera and connected to the magnet assembly 72 so that, when the solenoid 86 is energized, the magnet assembly 72 is moved to, in turn, move the film.

An electric motor 90 is mounted in the camera and is connected so that it tends to continuously rotate the take-up spool through an endless belt connection which slips when an increment of film has been wound on the take-up spool.

The camera includes a target assembly 95, including a source of light such as a small light bulb 101, that is mounted so that it projects a spot of light of predetermined configuration downwardly toward the table 21 of the camera apparatus. The size of the spot of light is adjusted so that the spot of light indicates exactly the field of the camera and the area which will be photographed. In photographing a list of names and addresses, the configuration of the spot is rectangular.

A button type control switch 108 (FIG. 2) is mounted on the easel 22 and is movable therewith. When the switch 108 is depressed the shutter is operated to expose the film and energize the magnet assemblies 71, 72 and solenoid 86 in the proper order to cause the film to be advanced by a predetermined increment.

A master switch 109 (FIG. 2) is provided on the table 21 to provide power to the various electrically actuated components of the camera apparatus.

Means are provided for indicating to the operator that the film supply on the film supply spool is low or that the leader has been fully wound on the take-up spool. These means are more fully shown and described in the aforementioned application, Ser. No. 705,853, filed Dec. 30, 1957, and include normally closed microswitches 118, 119 fixed on the camera housing in such a position that, when the film on the supply spool is low or the film on the take-up spool has not been wound on the take-up spool, at least a predetermined amount, the switches 118, 119 are actuated. When either of the switches 118, 119 is actuated, a light 122 on table 21 is deenergized to signal the operator (FIG. 2).

Power from a source of current is supplied through main power lines 125, 126. When the master switch 109 on the table 21 is closed, current is supplied through lines 127, 128 to the light fixture 25 in order to illuminate the surface of the table 21.

In addition, current is supplied through lines 129, 130 to the bulb 101 of the target assembly 95, thereby projecting the target onto the easel 22. Normally closed switches 118, 119 and the signal light 122 of the low-film indicating means are connected in series with the bulb 101 so that the signal light 122 is also energized. When switch 118 is opened due to low film supply on supply spool 53 or when switch 119 is opened because the proper length of leader is not wound on the film take-up spool, the target light 101 and the signal light 122 are deenergized so that the operator has two signals of these conditions.

Closing of the master switch 109 also supplies current to the motor 90 causing it to run continuously. In addition, current is supplied to the lines 131, 132 leading to the easel brake 42 so that when the foot switch 46 is depressed current is supplied to the easel brake 42 locking the easel 22 against movement laterally of the table 21.

The closing of the switch 109 also supplies current to the timer 134 through lines 135, 136. When the button switch 108 in line 135 on the easel 22 is depressed, the cycle of operations is initiated by the timer 134 to first energize solenoid 65 to open the shutter, and thereafter energize and deenergize the magnet assemblies 71, 72 and the solenoid 86 in the proper order to cause an increment of film to be advanced over the aperture.

This cycle of operations includes first energizing the magnet of magnet assembly 71, thereafter energizing solenoid 86 to swing the second magnet assembly 72 which is gripping the film toward the film take-up spool, then deenergizing the magnet of magnet assembly 71 to cause the film to be gripped over the aperture, energizing the magnet of magnet assembly 72, deenergizing solenoid 86 to return the magnet assembly 72 to its original position, and finally deenergizing the magnet of magnet assembly 72 to cause the magnet assembly to grip the film.

Provision is made for energizing the magnet assemblies 71, 72 in order to permit the threading of the film or the removal of the film when changing spools of film. Lines 138, 139 in FIG. 2 provide current through a double pole switch 140 to the magnet assemblies 71, 72 so that, by closing the switch 140, the magnet assemblies are energized to elevate the armatures and release the film. The switch 140 is mounted on the table 21 (FIGS. 1 and 3) and is preferably of the push-button type.

In use the operator places a sheet of paper having vertically extending columns of names and addresses, preferably typewritten, thereon on the easel 22. The master switch 109 is then operated. If sufficient film is on the film supply spool 51 and sufficient film leader has been wound on the film take-up spool. The signal light 122 will be illuminated and the target light 101 will project a spot of light onto the easel 22. The operator then moves the easel to bring the desired column of names and addresses into alignment with the spot of light projected by the target light 101. The operator then depresses the foot switch 46 to energize the easel brake 42 and lock the easel 22 against movement laterally of the table 21. The easel 22 may then be moved along the second shaft 33 and longitudinally of the table 21 to bring any of the names in the column into the area of the projected spot of light. As each desired name is brought into the area of the light the operator depresses the button switch 108 conveniently located on the easel, causing the camera to operate, that is, opening and closing the shutter and thereafter advancing the film to bring an unexposed area of film above the aperture.

After photographing the names and addresses in one column, the operator releases the foot switch 46 and moves the easel laterally of the table 21 to bring another column on the copy sheet into proper alignment. The foot switch 46 is then again depressed and the easel 22 is moved to successively bring the names and addresses into the area of the target light spot for photographing.

When the film supply on the film supply spool becomes low, the signal light 122 and the target light 101 will be extinguished indicating to the operator that the film supply is low.

When the operator wishes to remove the exposed film and provide a fresh spool of unexposed film, the operator depresses and holds down the switch 140 to energize the magnet assemblies 71, 72 thereby releasing the film gripped by the magnet assemblies and permitting the unexposed film to be threaded in the camera. The film is then threaded under the magnet assemblies and the operator releases the switch to deenergize the magnet assemblies.

We claim:

1. In a camera apparatus, the combination comprising a substantially flat inclined table which is inclined upwardly and rearwardly away from an operator, a first horizontal shaft mounted on said table and extending across the upper rear portion of said table in spaced relation thereto, a second shaft, a tubular member slidably mounted on said first shaft, one end of said second shaft being fixed to said tubular member, a substantially flat easel, means for slidably mounting said easel on said second shaft, said second shaft extending downwardly and forwardly toward the operator, laterally extending arms on the underside of said easel, rails on said table extending generally parallel to said second shaft, said arms slidingly resting on said rails.

2. The combination set forth in claim 1 including an electromagnet mounted on said tubular member and movable therewith, and an armature operable by energization of said electromagnet to engage said first shaft and lock said tubular member and in turn said second shaft and easel against movement longitudinally relative to said first shaft.

3. The combination set forth in claim 2 wherein said armature comprises a pin mounted for movement radially toward and away from said first shaft, the end of said pin adjacent said first shaft being concave for engagement with said shaft.

4. The combination set forth in claim 1 including means mounted on said easel for actuating a camera.

5. In a camera apparatus, the combination comprising a frame, a first shaft mounted on said frame and extending horizontally, a first member mounted on said first shaft for sliding movement longitudinally thereof, a second shaft mounted on said first member with its axis at generally right angles to the axis of said first shaft, a second member mounted on said second shaft for sliding movement longitudinally thereof, guide means for preventing relative rotational movement between said second shaft and said second member, said second member providing an easel for supporting an item to be photographed, and means mounted on said easel for actuating a camera.

6. In a camera apparatus, the combination comprising a frame, a first shaft mounted on said frame and extending horizontally, a first member mounted on said first shaft for sliding movement longitudinally thereof, a second shaft mounted on said first member with its axis at generally right angles to the axis of said first shaft, a second member mounted on said second shaft for sliding movement longitudinally thereof, guide means for preventing relative rotational movement between said second shaft and said second member, said second member providing an easel for supporting an item to be photographed, and an electromagnet mounted on said second shaft and movable therewith and having an armature operable by energization of the electromagnet to engage a portion of the first shaft and lock said second shaft against movement relative to said first shaft.

References Cited by the Examiner
UNITED STATES PATENTS

| | | | |
|---|---|---|---|
| 1,845,294 | 2/1932 | La Grande | 88—24 |
| 2,095,815 | 10/1937 | Hopkins | 88—24 |
| 2,296,655 | 9/1942 | Stuart. | |
| 2,428,627 | 10/1947 | Kalman | 88—24 |
| 2,520,296 | 8/1950 | Williams | 95—31 |
| 2,601,051 | 6/1952 | Nielsen | 88—24 |
| 2,690,696 | 10/1954 | Ashton | 88—24 |
| 2,742,814 | 4/1956 | Gage | 88—24 |
| 2,763,182 | 9/1956 | Urban et al. | 88—24 |
| 2,788,705 | 4/1957 | Huebner | 88—24 |
| 3,115,057 | 12/1963 | Lemche | 88—24 |
| 3,139,792 | 7/1964 | Wenthe | 88—24 |

NORTON ANSHER, *Primary Examiner.*

EMIL G. ANDERSON, *Examiner.*